Oct. 1, 1963
A. DI BELLA
3,105,656
BOBBIN SUSPENSION DEVICE IN SPINNING
MACHINES AND SIMILAR UNITS
Filed June 15, 1960
2 Sheets-Sheet 2
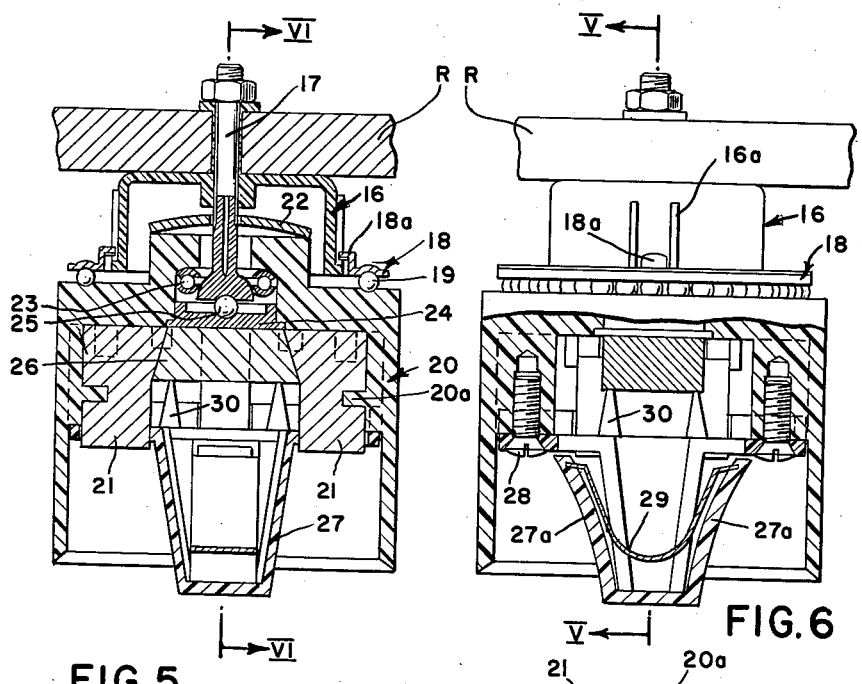
FIG. 5
FIG. 6
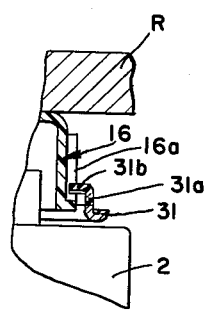
FIG. 8
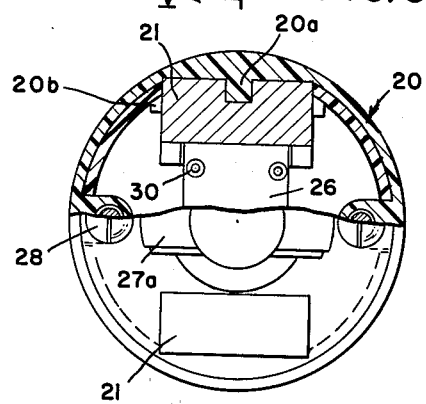
FIG. 7
INVENTOR.
ANGELO DI BELLA
BY
ATTORNEY

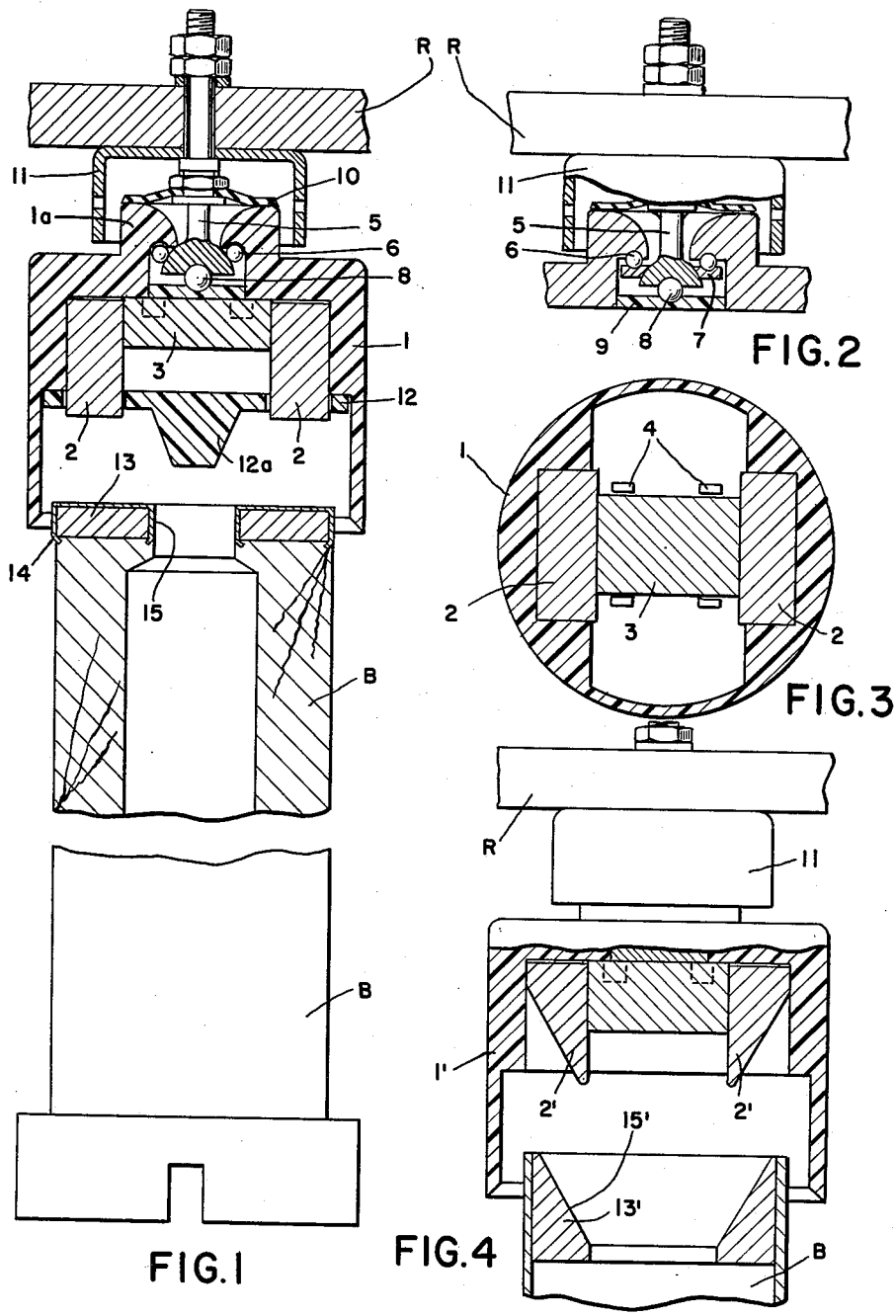

United States Patent Office 3,105,656
Patented Oct. 1, 1963

3,105,656
BOBBIN SUSPENSION DEVICE IN SPINNING MACHINES AND SIMILAR UNITS
Angelo Di Bella, Via Messina 17, Milan, Italy
Filed June 15, 1960, Ser. No. 36,299
Claims priority, application Italy June 16, 1959
11 Claims. (Cl. 242—130.2)

The bobbin suspension devices in spinning machines and similar units, comprise essentially a suspension pin with flared head and a turning body freely oscillating and rotating around the pin-head. Such bodies are fitted with mechanical means for fitting and releasing the pin and are well known.

The device according to the present invention is designed to eliminate various inconviences inherent in the above mentioned mechanical means owing to their constructional complexity and to the breakages that may be caused by repeated mechanical stresses.

The device according to this invention consists of a suspension pin which can be fixed to the rack of the machine, the lower end of which is provided with a mushroom-shaped head, of a hollow body freely turning and oscillating around the head of said pin by means of interposed steel balls, of a permanent magnet fitted inside said hollow body and having two or more pole-shoes protruding essentially downwards, and of an armature of ferrous material fitted on the head of the bobbin and having surfaces that are adapted to come into contact with said pole-shoes to close the magnetic circuit.

By this device the bobbin is inserted and held to the hollow body only through the action of the magnetic force exerted between the pole-shoes and the armature, whilst the bobbin can be released simply by a pull in the direction opposite to that of the attracting force.

The hollow-body is preferably obtained by stamping one piece of synthetic material, especially self-lubricating olefinic resin: in the inside of the hollow body there is provided in the housing of the permanent magnet and its pole-shoes, so that said organs can be fitted in the hollow body by means of a resinous cementing substance, without the aid of any mechanical connecting organ, or by means of radial projections penetrating into appropriate holes made on the side walls of said pole-shoes.

Furthermore, on its upper bottom, at the level of the hole for the shank of the suspension pin, the hollow body shows a ring-shaped groove with a semicircular section obtained by stamping, which can be used as a rolling surface for steel balls introduced between the mushroom-shaped head of the suspension pin and the hollow body.

In order to avoid dust or other external agents entering the hollow body, there has been provided the fitting of a disc of non-magnetic material, preferably of synthetic material, which partly closes the cavity containing the magnet, with the exception of the extreme surfaces of the pole-shoes protruding from holes made in said disc.

The perforated head of the hollow body, through which passes the suspension pin, may be closed by a disc of elastic material the center of which is fixed to the suspension pin and which peripherally rests on the edge of the hole made in the hollow body.

The lower closing disc can advantageously be provided with a projection having the shape of a truncated cone coaxial to the body to facilitate the centering of the bobbin, by guiding the armature towards the pole-shoes during the insertion of the bobbin.

According to a variation, the outer surfaces of the pole-shoes and the tallying surface of the corresponding armature secured to the bobbin, can have a conical shape. In this case the same surfaces act as a centering guide when the bobbin is inserted into the hollow body.

The armature secured to the bobbin has a central hole, and its dimensions are such that the bobbin can be fitted both to the magnetic bobbin-holder in accordance with the finding, and to other bobbin-holders of the conventional type.

The following description will deal also with other characteristics relating to some forms of construction; these forms are described as examples, as disclosed in the drawing in which:

FIGURE 1 is a vertical longitudinal section through a bobbin holding device and an upper fragment of a bobbin which has a central portion broken away;

FIGURE 2 is a side view of an upper fragment of a bobbin holding device partially broken away in vertical section;

FIGURE 3 is a horizontal section taken from below just beneath the magnet through the bobbin holding device;

FIGURE 4 is a side view of a modification of the bobbin holding device and an upper fragment of a bobbin partially broken away in vertical section;

FIGURE 5 is a vertical longitudinal section through a second embodiment of this invention;

FIGURE 6 is a vertical longitudinal section taken on line VI—VI of FIGURE 5;

FIGURE 7 is a bottom view of the bobbin holding device forming the second embodiment of this invention with a portion of the bobbin holding device broken away in horizontal section; and, FIGURE 8 is a vertical longitudinal section through a fragment of a bobbin holding device showing a modification of the second embodiment of the invention.

The suspension device as shown in FIGS. 1 to 3 features a bell-shaped hollow body 1, obtained as a one-piece stamping of plastic material, in the inside of which are provided the housings for the two opposite pole-shoes 2 between which is inserted a permanent magnet 3 held by four projections 4 protruding downwardly from the bottom of the hollow body 1. The pole-shoes and the magnet can be fixed to the body 1 by glueing, so that their mutual position is exactly maintained.

The body 1 shows a perforated head 1a for the free passage of the shank of the suspension pin 5 which partly represents a mushroom-shaped head, in the inside of which there is a ring-shaped groove having a semicircular section, which makes up the rolling seat of a row of steel-balls 6 resting on the mushroom-shaped head of said pin. According to a variation shown in FIG. 2, the row of steel-balls 6, instead of resting directly on the mushroom-shaped head of the pin 5, is supported by a grooved ring 7 which rests on said head and oscillates freely on the same. The oscillation center of the system is represented in both cases by a steel-ball 8 held between a spherical cavity provided in the lower surface of the mushroom-shaped head of the suspension pin 5 and a spherical cavity provided in the upper surface of a small disc 9 of synthetic material fitted at the level of the inner bottom of the hollow body 1. On the shank of the pin 5 there is fitted a small disc of elastic material 10 which covers the perforated head 1a of the hollow body 1 to prevent dust entering the inside of said body. A bell-shaped cap 11 fixed to the rack R through the suspension pin 5, contributes to keep dust off the row of steel-balls 6.

The cavity provided in the inside of the body 1 and containing the magnet 3 is closed by a disc of synthetic material 12 resting and fixed on an inner shoulder of said body. The disc has two openings for the passage of the two pole-shoes 2. Said disc has at the center a projection having the shape of a truncated cone 12a which is designed to guide and center the bobbin B when it is inserted.

The bobbin B has at the upper end a flat ring of ferrous material 13 held by a sheet-iron ring 14 which surrounds the ring 13 and is clipped to the wood that makes up the bobbin.

When the bobbin B is inserted with its upper end into the hollow body 1, the pin having the shape of a truncated cone 12a of the disc of synthetic material 12 automatically centers the bobbin by entering into the bore 15 provided in the bobbin, and the steel-sheet ring 14 will come into contact with the ends of the pole-shoes 2 protruding from said disc, thus establishing a magnetic circuit with the rings 13 and 14 which is capable of holding the bobbin suspended in said body. The bobbin and the hollow body will then be free to oscillate with respect to the suspension pin 5 around the center of the steel-ball 8: the rotation is ensured by the row of steel-balls 6 which can freely follow the oscillations due to the spherical surface of the mushroom-shaped head of said pin on which said steel-balls 6 revolve.

In the variation shown in FIG. 4, the two pole-shoes 2' each have a conical lower, outward facing surface corresponding to a conical cavity 15' in the ring of ferrous material 13' fitted to the upper end of the bobbin B. The centering of the bobbin with respect to the hollow body is, in this case, ensured by the tallying of said conical surfaces: this makes possible the utilization of the same hollow body 1' for bobbins having different diameters provided these are fitted with a ring 13' having an adequate conical inner surface.

FIGURES 5 to 7 show a variation in the construction of the suspension device, which exhibits some considerable advantages compared to the above described forms of construction: in particular, it features the possibility of introducing into the bobbin holder bobbins with different diameters without the need for modifying the bobbins.

The bobbin-holder shown in FIGURES 5 to 7 features a bell-shaped cap 16 of synthetic material secured to the rack R by means of a self-adjusting pin 17 preferably of synthetic material, reinforced on the inside, screwed on the hub of said cap and inserted into the rack R: said pin shows partly a mushroom-shaped head with a central cavity on its lower surface.

The cap 16 shows on its cylindrical surface two pairs of diametrically opposite parallel ribs 16a, which are designed to act as vertical sliding guides, with a stop at the bottom, for two radial tongues 18a of a ring of ferrous material 18 which, on its lower surface, shows a ring-shaped guiding groove for a row of steel-balls 19.

The row of steel-balls 19 is guided partly in a ring-shaped groove provided on the upper surface of a hollow body 20 of synthetic material and containing two pole-shoes of sintered soft iron 21, which are firmly fixed to said body by means of two radial projections 20a, which penetrate into appropriate holes made on the side walls of said pole-shoes, so that the lower surfaces of these are situated on a common plane.

The perforated hub of the hollow body 20 rests with its upper surface on a perforated disc 22 introduced about the pin 17. Between an inner shoulder of said hub and the mushroom-shaped head of the supporting pin 17 there is inserted a bearing consisting of a row of steel-balls 23 freely sliding in appropriate ring-shaped grooves provided on two opposite rings. The upper rolling seat of the row of steel-balls 23 could also consist of a groove provided in the hub of the body 20, so that it would be possible to dispense with the upper guiding ring of said bearing. In the hole of the hub of the body 20, there is furthermore inserted a cup 24 with a flat bottom and a circular edge, turned upwards, which is designed to prevent the fall of the supporting rings of said row of steel-balls: this cup has a central cavity for accommodating a steel-ball 25 the upper surface of which fits into the central cavity provided under the mushroom-shaped head.

The two pole-shoes 21 housed in the body 20 have between them a space in which there is fitted a permanent magnet 26 having a trapezoidal section, centered on the piece by means of four projections 20b which extend from the inner bottom of said body, and the action of which, besides being exerted on the opening of the bobbin B as specified farther on, is exerted also on the ring 18 which, being attracted by said magnet, exerts a braking action on the body 20 through the row of steel-balls 19. This braking action compensates the progressive increase in the turning speed of the bobbin, due to the progressive winding-off of the thread, thus ensuring a uniform tension of the thread.

In the inside of the body 20 there is also fixed a conical pin of synthetic material 27, with a flange in which there are provided two holes for two screws 28 of synthetic material for fixing said conical pin in said body, as well as two holes for the ends of the pole-shoes 21. The screws 28 are conveniently locked and sealed in position by a hot welding spot.

The conical pin 27 shows two diametrally opposite flaps or tongues 27a starting from the lower base of said pin and held diverging at their free ends by an arcuated elastic member 29 the ends of which are inserted into the free ends of said flaps. Said flaps are designed to center the bobbin, regardless of the diameter of its hole.

The flange for fixing the conical pin 27 shows furthermore on its inner surface four upward projections for holding in position the magnet 26, the cup 24, the ball 25, the pin 17 and the row of balls 23: said group of elements is fixed to the body 20 by the above mentioned screws.

To fit the bobbin B into the described bobbin-holder, it is sufficient to introduce it into the hollow body 20: the conical pin, which penetrates elastically into the hole 15 will center the bobbin with respect to the body, whilst the attractive force is provided by the magnetic action of the magnet 26 on the steel-sheet ring 13 and on the ring 14 of the bobbin. The bobbin, suspended to the bobbin-holder, can freely turn and oscillate with respect to the cap 16, thanks to the rows of steel-balls 19 and 23 and to the central steel-ball 25. The presence of the ring of ferrous material 18, in addition to exerting a mechanical and magnetic braking action on the turning motion of the bobbin, as stated above, offers also the advantage of closing permanently the magnetic circuit of the magnet 26 when the bobbin is released from the bobbin-holder. The variation as in FIG. 8 shows a simplified construction in which the row of steel-balls 19 over the hollow body 20 is eliminated. In this case the ring of ferrous material 18 that surrounds the cap 16 is replaced by a ring consisting of a circular lip 31 of soft iron surmounted by a collar of synthetic material 31a which presents two diametrally opposite flaps engaged between the pairs of guiding ribs 16a of the cap 16.

The circular lip of soft iron 31 also exerts a braking action on the turning motion of the hollow body 20 as in the previous example, whilst the hollow body and the bobbin holder suspended to it can still oscillate.

What I claim is:

1. A suspension device for bobbins in a spinning machine comprising, in combination, a suspension pin fixed to extend downward from the rack of the spinning machine, a head having a spherical surface facing upward from the bottom of said pin, a hollow body having a top portion extending over the head of said pin and about said pin, said hollow body having sides extending downward from said top portion, ball bearing means engaging the head of said pin enabling said hollow body to rotate and oscillate about the head of said pin, a permanent magnet fixed across said hollow body below the head of said pin extending beyond the sides of the head of said pin, pole pieces fixed to the ends of said magnet extending downward within said hollow body, a cap fixed about said pin extending downward above the top of said hollow body, a ferrous ring disposed about said cap, means preventing said ring from rotating relative to said cap, and a member of ferrous material fixed to the top of a bobbin, said member of ferrous material being held within said hollow body on contacting said pole pieces, said magnet attracting said ring downward into braking contact with the top of said hollow body.

2. The combination according to claim 1 wherein said ferrous ring contains a downward facing race and the top of said hollow body contains an upward facing race, and with the addition of bearing balls between the races in said ring and said hollow body.

3. The combination according to claim 1 wherein said means preventing the rotation of said ring about said cap comprises vertical guide ribs on said cap and an inward projection extending from said ring engaging at least one of said guide ribs.

4. The combination according to claim 1 wherein said hollow body contains an inner shoulder, the hollow body having a plurality of downwardly extending projections, a disc having a plurality of openings therethrough fitted to said body, said disk being operative to close the hollow body, said disc being seated on the inner shoulder of said hollow body and fixed within said hollow body, said pole pieces extending through the openings in said disk and said magnet being supported by the downwardly extending projections in said hollow body holding said magnet within said hollow body to the top portion of said hollow body.

5. The combination according to claim 4 with the addition of a bearing disk containing an upward facing depression, and a ball, said pin containing a downward facing depression, said bearing disk being held by said magnet above said magnet to the underside of the upper portion of said hollow body, said ball being seated in the depression in said pin and said bearing disk allowing said hollow body to oscillate about said ball.

6. The combination according to claim 5 wherein said closure disk has a downward tapering central projection, said member of ferrous material fixed to a bobbin containing a central aperture which is aligned about said downward tapering central projection.

7. The combination according to claim 6 wherein said central projection of said closure disk has two upward projecting tongues and with the addition of spring means urging said tongues outward, said tongues engaging the central aperture of said member of ferrous material aligning a bobbin within said hollow body.

8. A suspension device for bobbins in a spinning machine comprising, in combination, a suspension pin fixed to extend downward from the rack of a spinning machine, a mushroom shaped head facing upwards on the bottom of said pin, a hollow body having a top portion extend over the sides of the head of said pin and having sides extend downward from said top portion, bearing means engaging the head of said pin supporting the top portion of said hollow body enabling said hollow body to rotate and oscillate about the head of said pin, a permanent bar magnet disposed horizontally across and inside said hollow body, pole shoes protruding downward from the ends of said magnet within said hollow body, and a member of ferrous material fixed to the top of a bobbin, said member of ferrous material being held within said hollow body by said magnet by means of said pole shoes to suspend a bobbin, said pole shoes extending downward from the ends of said magnet and have lower surfaces tapering inward and wherein said member of ferrous material fixed to the top of a bobbin contains a conical central depression tapering inward and corresponding to the taper of the lower surfaces of said pole shoes, said pole shoes centering said member of ferrous material and thereby said bobbin within said hollow body.

9. A suspension device for bobbins in a spinning machine comprising, in combination, a suspension pin fixed to extend downward from the rack of a spinning machine, a mushroom shaped head facing upwards on the bottom of said pin, a hollow body having a top portion extend over the sides of the head of said pin and having sides extend downward from said top portion, bearing means engaging the head of said pin, supporting the top portion of said hollow body enabling said hollow body to rotate and oscillate about the head of said pin, a permanent bar magnet disposed horizontally across and inside said hollow body, pole shoes protruding downward from the ends of said magnet within said hollow body, and a member of ferrous material fixed to the top of a bobbin, said member of ferrous material being hold within said hollow body by said magnet by means of said pole shoes to suspend a bobbin, a plurality of projections extending downward from the top portion of said hollow body inside said hollow body, said projections extending downward by the sides of said magnet locating said magnet which is glued to the top portion of said hollow body, said hollow body containing depressions formed on the inside of the sides of said hollow body and wherein said pole shoes contain horizontal openings in their outwardly disposed ends, and with the addition of horizontal projections extending horizontally inward within the depressions in the sides of said hollow body, said horizontal projections extending into the openings in said pole shoes securing said pole shoes within the depressions in the sides of said hollow body.

10. A suspension device for bobbins in a spinning machine comprising, in combination, a suspension pin fixed to extend downward from the rack of a spinning machine, a mushroom shaped head facing upwards on the bottom of said pin, a hollow body having a top portion extend over the side of the head of said pin and having sides extend downward from said top portion, bearing means engaging the head of said pin supporting the top portion of said hollow body enabling said hollow body to rotate and oscillate about the head of said pin, a permanent bar magnet disposed horizontally across and inside said hollow body, pole shoes protruding downward from the ends of said magnet within said hollow body, and a member of ferrous material fixed to the top of a bobbin, said member of ferrous material being held within said hollow body by said magnet by means of said pole shoes to suspend a bobbin, a disk within and across the top of said hollow body below the mushroom shaped head of said pin, and a ball, said disk containing an upward facing central depression and the bottom of said pin containing a downward facing central depression, said ball being seated between the depressions in said pin and said disk, said bearing means supporting said hollow body on said mushroom shaped head of said pin with said disk and said hollow body fixed to disk oscillating about said ball.

11. A suspension device for bobbins in a spinning machine comprising, in combination, a suspension pin fixed to extend downward from the rack of a spinning machine, a mushroom shaped head facing upwards on the bottom of said pin, a hollow body having a top portion extend over the sides of the head of said pin and having sides extend downward from said top portion, bearing means engaging the head of said pin supporting the top portion of said hollow body enabling said hollow body to rotate and oscillate about the head of said pin, a permanent bar magnet disposed horizontally across and inside said hollow body, pole shoes protruding downward from the ends of said magnet within said hollow body, and a member of ferrous material fixed to the top of a bobbin, said member of ferrous material being held within said hollow body by said magnet by means of said pole shoes to suspend a bobbin, a plurality of projections extending downward from the top portion of said hollow body inside said hollow body, said projections extending downward by the sides of said magnet locating said magnet which is glued to the top portion of said hollow body, a disk within and across the top of said hollow body below the mushroom shaped head of said pin, and a ball, said disk containing an upward facing central depression and the bottom of said pin containing a downward facing central depression, said ball being seated between the depressions in said pin and said disk, said bearing means supporting said hollow body on said mushroom shaped head of said pin with said disk and said hollow body fixed to said disk oscillating about said ball.

References Cited in the file of this patent

UNITED STATES PATENTS 2,527,391     Blais _____ Oct. 24, 1950